INVENTOR
Hans-Ch. von Fraunberg

BY *Albert M Zalkind*

ATTORNEY ary position relative to the housing 4.
United States Patent Office 3,492,711
Patented Feb. 3, 1970

3,492,711
SHAFT AND STEERING SPINDLE BEARING
DEVICE AND ASSEMBLY METHOD
Hans-Ch. von Fraunberg, Alfdorf, Germany, assignor to
Zahnradfabrik Friedrichshafen, Aktiengesellschaft, a
corporation of Germany
Filed June 23, 1967, Ser. No. 648,480
Claims priority, application Germany, June 30, 1966,
Z 12,306
Int. Cl. B21h 1/16
U.S. Cl. 29—148.4                                    4 Claims

ABSTRACT OF THE DISCLOSURE

The invention relates to a method and article wherein ball bearings are arranged in the groove of a shaft or vehicle steering spindle and secured on the shaft between a pair of outer ball race members wherein one member is initiallly offset from the grovoe which forms the inner race, in order to provide an opening for filling the groove with ball bearings.

The prior art for accomplishing this purpose is exemplified in Germany utility Patent 1,718,426 (63c, 47), the present invention being a simpification and effecting an economy.

The present invention teaches the assembling of an array of ball bearings around a shaft wherein a shaft groove forms an inner race and wherein two outer race members are utilized. One outer race member which forms one side of the complete outer race is mounted on the shaft in a position which is offset axially from the shaft groove so as to effect an opening larger than the diameter of the balls. Thereafter an identical outer race member is slid onto the shaft into position engaging its respective side of the ball array and locked in place. Thus the balls can be placed in the shaft groove and retained against falling out during assembly. The method descibed thus far results in an assembly of a ball bearing on a shaft wherein one outer race member remains slidable on the shaft, this being the outer race member which was initially offset from the inner race groove, and the other outer race member is locked in place. Such as an assembly of shaft and bearing can be assembled in conjunction with a housing or can be stored to be used when needed. For assembly in a housing it is merely slid into a recess or socket whereby the slidable outer race member is pushed into permanent position contiguous with the respective side of the ball array. Accordingly, the entire assembly thus effects a shaft having ball bearing support in a housing element and is particularly useful in assembling steering shafts within power steering housings.

The invention is illustrated with reference to the drawing wherein three fragmentary longitudinal sections provide all necessary disclosure.

Figure 1:
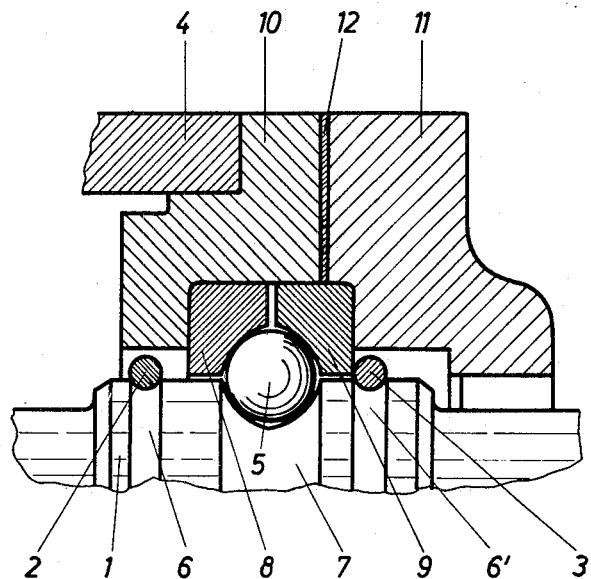
FIGURE 1 shows a ball bearing assembly, steering spindle and housing, which has been assembled in accordance with the teaching of the invention.
Figure 2:
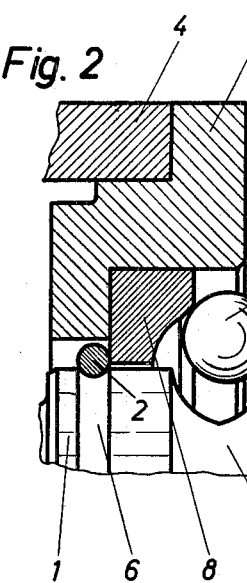
FIGURE 2 illustrates an assembling step.

Referring to the drawing, and particularly FIGURES 1 and 2, a shaft 1 is shown, in this case a steering spindle having a inner ball race groove 7 and a snap ring 2 secured in a suitable groove 6. As illustrated in FIGURE 2, a ball race member 8 has been brought into abutment with the snap ring 2, such snap ring forming an abutment means that predetermines the position of the member 8 with respect to the groove 7 so as to produce an angled opening between the raceway surface in member 8 and the groove 7. The opening is of sufficient size to permit entry of balls such as 5. In other words, the opening which is partially peripheral and partially lateral has an entrance gap which is larger than the ball diameter whereby an array of balls may be furnished in groove 7. Thereafter an identical outer race member 9 is slid onto the shaft in contiguity with the respective side of the ball array, as shown in FIGURE 1, and a snap ring 3 in groove 6' in the shaft is applied to lock race member 9 in position on the shaft.

Subsequently the shaft may be slid into final position with respect to the housing 4 which carries a flange 10 abutting race member 8. This final positioning of the shaft effects sliding of race member 8 into final position as will be apparent by comparison of FIGURE 2 with FIGURE 1. In this instance, the shaft can be held horizontally as the balls will be retained against rolling out by race member 9 secured axially by snap ring 3.

It will, of course, be understood that the race member 8 may first be inserted in flange 10 for effecting the first step in the assembly method. In this second instance, the shaft will be held vertically while groove 7 is being filed with balls. In either event, once the abutment means 2 has served its purpose of effecting a predetermined offset position for the race member 8 it no longer functions as part of the complete assembly after the shaft has been positioned in the flange 10 but is permitted to remain on the shaft. However, ring 2 once again effects a function in the event of disassembly of the shaft and bearing from flange 10. Thus it will be understood that the spacing between rings 2 and 3 is such that even though race member 8 may be in abutment with ring 2 the gap between the race members is smaller than the diameter of the balls 5 so that they are retained on the shaft. This feature is of advantage where it may be desired to assemble ball bearings on shafts and maintain storage of such assemblies for use as required.

In final assembly a further flange 11 which will be understood to be axially adjustable clamps a spacer disc 12 against flange 10 to lock the bearing assembly in stationary position relative the housing 4.

Figure 3:
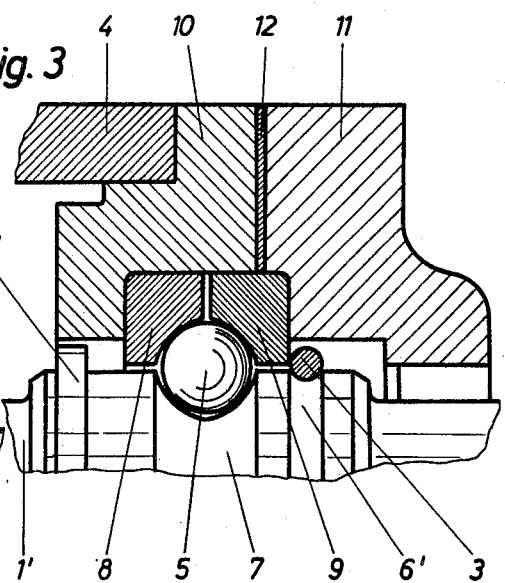
FIGURE 3 is virtually identical to the combination of components of FIGURES 1 and 2 but modified to the extent of providing a somewhat different stop element for determining the initial offset position of one of the outer ball race members.

In FIGURE 3, all reference characters and all parts are identical to the same components shown in FIGURE 1, the difference being that a collar 2' integral with the spindle 1' serves as an abutment means for the initial offset position of race 8, in substitution for the separable snap ring 2 in FIGURES 1 and 2.

It will be understood that ring 3 can be eliminated if the spindle and bearing assembly are incorporated in the housing elements during assembly as shown in FIGURE 2. In such case, flange 11 is then thrust home to lock member 9 in position.

What is claimed is:
1. A method of assembling a ball bearing on a steering spindle which comprises forming a peripheral groove around the spindle to form an inner race, initially positioning an outer race member on said spindle offset axially from said groove a sufficient distance to effect an opening for insertion of a plurality of balls into ball bearing array wherein said opening is larger than the diameter of said balls, filling said groove with balls, positioning another outer ball race member on said shaft to retain said balls in said groove, and locking said latter outer ball race member in retaining position leaving said first mentioned ball race member slidably disposed on said shaft.

2. A method as set forth in claim 1 including providing said spindle with an abutment to serve as a stop for initially positioning said first mentioned outer ball race member.

3. A preassembled ball bearing device for a steering spindle for assembly in a housing, comprising a spindle having a peripheral groove, an array of balls in said groove, an outer race member on each side of said array, abutment means on said spindle to secure one of said outer race members in a position to retain said array; and means permitting predetermined axial slidability of the other outer race member to open a gap for insertion or removal of balls in the absence of said one outer race member.

4. A device as set forth in claim 3, said means comprising an abutment on said spindle spaced from said other outer race member and serving as a limit stop to sliding movement of said other outer race member.

References Cited

UNITED STATES PATENTS

| | | | |
|---|---|---|---|
| 651,376 | 6/1900 | Morrill et al. | 308—196 |
| 1,176,170 | 3/1916 | Schatz. | |
| 1,301,323 | 4/1919 | Schatz | 29—148.4 |
| 2,907,353 | 10/1959 | Van Deventer | 308—196 X |

THOMAS H. EAGER, Primary Examiner

U.S. Cl. X.R.

29—434; 308—189, 196